United States Patent [19]

Neracher

[11] 4,367,553
[45] Jan. 4, 1983

[54] PULSE LASER WITH AN ELECTRICALLY EXCITED GASEOUS ACTIVE MEDIUM

[75] Inventor: Arnold Neracher, Chancy, Switzerland

[73] Assignee: Battelle Memorial Institute, Carouge, Switzerland

[21] Appl. No.: 130,163

[22] PCT Filed: Dec. 22, 1978

[86] PCT No.: PCT/CH78/00055
§ 371 Date: Aug. 23, 1979
§ 102(e) Date: Aug. 23, 1979

[87] PCT Pub. No.: WO79/00432
PCT Pub. Date: Jul. 12, 1979

[30] Foreign Application Priority Data

Dec. 23, 1977 [CH] Switzerland .................. 15975/77

[51] Int. Cl.³ .................................................. H01S 3/09
[52] U.S. Cl. .................................... 372/55; 372/83; 372/92
[58] Field of Search ............. 331/94.5 PE, 94.5 P, 331/94.56 D

[56] References Cited

U.S. PATENT DOCUMENTS 4,114,113  9/1978  Hasson et al. ............. 331/94.5 PE
4,166,252  8/1979  Salzmann et al. ......... 331/94.5 PE
4,292,600  9/1981  Neracher .................... 331/94.5 G

*Primary Examiner*—William L. Sikes
*Assistant Examiner*—Léon Scott, Jr.
*Attorney, Agent, or Firm*—Karl F. Ross

[57] ABSTRACT

A laser comprises a prismatic or cylindrical metal box surrounding two correspondingly shaped stacked blocks of nonconductive material with a dielectric constant of 80 or more, the two blocks being separated by a first metal plate forming a first capacitor with one block and with a second metal plate resting on the opposite end face thereof while forming a second capacitor with the other block and with the base of the box. The cover of the box spacedly overlies the second metal plate and is insulatedly traversed by a conductive stud contacting the second plate whereby a direct-current source can be connected across the two stacked capacitors. A gas-filled cavity formed alongside or inside the block resting on the base is bounded laterally or at its ends by metallic extensions of that base and of the first plate forming two confronting electrodes shunted by a resistive or inductive impedance element which is connected between the box and the first plate whereby the second capacitor is normally discharged while the first capacitor is charged by the source. A momentary short-circuiting of the second plate to the cover, as by a spark gap broken down by a trigger pulse, lets the first capacitor discharge into the second one and thus builds up a potential difference across the electrodes of the laser cavity, stimulating the gas therein into the emission of a laser pulse which is reflected by a mirror at one end of the cavity and exits through a window at its opposite end.

20 Claims, 9 Drawing Figures

PULSE LASER WITH AN ELECTRICALLY EXCITED GASEOUS ACTIVE MEDIUM

CROSS-REFERENCE TO RELATED APPLICATIONS

This application contains subject matter described in my commonly owned copending applications Ser. No. 808,525 filed 21 June 1977, now U.S. Pat. No. 4,292,600, and Ser. No. 161,387 filed 20 June 1980 as a continuation-in-part of the former.

FIELD OF THE INVENTION

My present invention relates to a pulse laser having a cavity filled with an electrically excited gaseous active medium.

PRIOR ART

To obtain the laser effect in various molecular gas, metal-vapor or excimer active media it is necessary to use pumping methods able to release very high pumping energy within a very short time period (a few nanoseconds). A certain number of pumping methods able to produce such an effect are already known, of which the most widely utilized ones consist of generating electrical discharges with a very large current (from a few tens to a few hundred kA) within the active medium. Such electrical excitation is essentially effected according to two main modes, namely longitudinal gas excitation (which can be effected by means of two electrodes placed at each end of the laser cavity) and transverse gas excitation (which can be effected by means of two electrodes disposed parallel to the optical axis of the cavity).

Various means for longitudinal or transverse excitation have already been developed at the present time, notably devices based on the use of so-called "charge transfer" systems. These "charge transfer" systems, designed to convey to the electrodes the high-voltage electrical pulse which is to trigger the stimulated emission within the laser cavity, are generally constituted by a suitable assembly of conventional capacitors comprising an insulant of low dielectric coefficient (generally Mylar). However, all these conventional "charge transfer" devices give rise to problems of matching the pumping circuit to the gas, reducing the impedance of the discharge circuit and obtaining rise times for the high-voltage pulses which are compatible with the short life of the laser transitions. The methods used at the present time to solve these different problems, and in particular to allow sufficient electrical energy to be stored, lead to the construction of large-dimension devices which have the serious disadvantage of considerable bulk and much reduced maneuverability.

OBJECT OF THE INVENTION

The object of the present invention is to at least partly obviate the aforementioned drawbacks by proposing a so-called "integrated" structure which enables a particularly compact laser to be obtained.

SUMMARY OF THE INVENTION

A laser according to my invention comprises a pair of stacked nonconductive blocks of solid material having a high dielectric constant, each block having two flat opposite end faces parallel to and substantially coextensive with those of the other block. A first metallic member is inserted between and in contact with two juxtaposed end faces of these blocks and defines a first capacitor with the first block and with a second metallic member overlying another end face thereof; depending on whether the blocks are prismatic or cylindrical, these two metallic members may be rectangular plates or circular disks substantially coextensive with the adjoining end faces. A third metallic member, which in the embodiments described hereinafter is a wall portion of a metallic housing surrounding the stacked blocks, overlies another end face of the second block and defines with that block and with the first member a second capacitor in cascade with the first one. The housing encloses an elongate cavity, filled with a radiation-emissive gaseous medium, that is bounded in part by a pair of confronting, spaced-apart electrodes formed by respective extensions of the first and third members which are galvanically interconnected by resistive or inductive impedance means. I further provide terminal means, such as a conductive stud insulatedly penetrating a metallic housing cover and contacting the second member spacedly overlain by that cover, for connecting a source of direct current between the second and third members to develop a voltage difference across the cascaded capacitors and thus to charge the first capacitor even as the second capacitor is kept substantially discharged by the aforementioned impedance means. A temporary interconnection of the first and second members with the aid of discharge-initiating means inserted therebetween, e.g. by the breakdown of a spark gap between the second member and the housing cover through an applied trigger pulse establishes a virtual short circuit across the cascaded capacitors whereby the first capacitor is enabled to discharge into the second capacitor and to set up a potential difference across the impedance means and the confronting electrodes in parallel therewith; this potential difference stimulates the gaseous medium in the cavity into an emission of luminous coherent radiation which exits through a window transparent to that radiation provided in the housing adjacent one end of the cavity.

Advantageously, the first capacitor has a substantially higher capacitance than the second one; since the potential difference developed across the second capacitor during the short-circuiting operation is inversely proportional to its capacitance, this increases the ratio between the radiation-stimulating potential difference and the source voltage. The desired capacitance ratio can be established by making the thickness of the first capacitor—measured between its parallel end faces—smaller that the corresponding thickness of the second capacitor, preferably about half as large.

I further prefer, again in conformity with the specific embodiments described hereinafter, to let the second block form a boundary of the laser cavity between the confronting electrodes thereof. With prismatic blocks this boundary is formed by a lateral face of the second block partly overlain by a pair of flanges constituting the electrode-forming extensions of the first and third members, i.e. of the interposed rectangular plate and of the housing base, these members having free edges paralleling the longitudinal cavity axis. With cylindrical blocks the cavity is defined by an axial bore of the second block, the electrode-forming extensions being a pair of annular elements projecting into that bore from opposite ends; the diameter of the peripheral cavity wall formed by this bore may be reduced by the insertion of a dielectric tube.

Preferably, the material used for the nonconductive blocks has a dielectric coefficient or constant equaling or exceeding 80. Dielectric materials which satisfy this requirement include ferro-electrical dielectrics such as pure barium titanate, or materials based on barium titanate and doped with compounds such as $Pb(Ti,Zr)O_3$, $BaO\text{-}TiO_2\text{-}Al_2O_3$, $PbZrO_3$, $PbHfO_3$, $PbTiO_3$, $CaTiO_3$, $La^{3+}$ or $Nb^{5+}$. Possible dielectric materials which may be used also include materials such as $TiO_2$, KDP (potassium dideuterophosphate $KH_2PO_4$), possibly in its activated form KD*P, or $LiNbO_3$, for example. It is particularly advantageous to use the aforementioned materials in ceramic form.

These dielectric blocks can be of the most varied shapes such as cylindrical of circular or noncircular cross-section, prismatic of rectangular, triangular or trapezoidal cross-section, or of a more complicated profile. The essential characteristic is that the blocks comprise at least two opposite end faces on which suitable metal plates can be fitted to form the required charge-transfer structures. The thickness of the dielectric blocks (i.e. the distance separating the opposite end faces of the blocks) is chosen in dependence upon the dielectric strength of the material used, so as to be able to accommodate high applied voltages (which may lie between 1 and 100 kV). As the dielectric strength of the aforesaid materials is generally lower than that of the more usual dielectrics such as Mylar, the thickness of the blocks so made must be suitably increased (generally by one order of magnitude). However, as the dielectric coefficient of these materials is considerably higher, the cross-sections of these blocks can be considerably smaller, for equal stored energy, than that required for conventional charge-transfer systems since the capacitance of a condenser is proportional to the dielectric coefficient and area and is inversely proportional to the thickness. As these area reductions can reach three orders of magnitude, it is apparent that a considerable degree of compactness can be obtained.

The use of high-dielectric-coefficient materials, already disclosed in my above-identified prior applications and patent, also results in a considerable reduction in the characteristic impedance of the charge-transfer systems. Such a reduction in characteristic impedance enables a more rapid rate of current rise to be obtained in the laser cavity, resulting in a higher electron density and temperature as well as a higher rate of population inversion, thus affording an overall increase in the efficiency and peak power of the laser.

It is also known that the laser activity must have a minimum length to be able to produce stimulated emission. Recent studies have shown that this threshold value is inversely proportional to the initial density of population inversion. It therefore follows that reducing the characteristic line impedance has the additional advantage of shortening this threshold length, which also helps reduce the overall size. The aforesaid studies have further shown that there is a nonlinear relationship between the peak output power and cavity length, this peak power rising at first exponentially and then linearly up to a saturation value as the cavity length gradually increases. It can therefore be seen, in contrast to what is generally accepted, that it is not necessary to have great cavity lengths in order to obtain acceptable peak powers.

It is also known that the dielectric coefficient of ceramic materials depends on temperature and attains a maximum in temperature ranges close to their Curie point. It is therefore advantageous to use materials with a Curie point close to or slightly greater than ambient temperature, so as to avoid the need for temperature-controlled enclosures. Preferably, materials are used with a Curie point substantially greater than ambient temperature where it is envisaged to operate at high recurrence frequencies which cause these materials to attain an operating temperature substantially above ambient. The required value of the Currie point can be obtained, in known manner, by appropriately doping these materials. In some special cases, on the other hand, I may use materials with a Curie point much lower than ambient temperature (for example KDP, whose high dielecric coefficient at $-150°$ C. enables an ultra-compact structure to be designed) while providing a temperature-controlled enclosure in which the required temperature is maintained for example by Peltier cells of low electrical consumption, as likewise disclosed in my prior applications and patent.

Various gases can be used as the active medium to give stimulated emissions, including pure gases (e.g. hydrogen, nitrogen, deuterium or neon), molecular gases (e.g. carbon monoxide or carbon dioxide), gas mixtures (such as a helium-nitrogen mixture, a nitrogen-fluorine mixture or air, for example), excimer gases (such as KrF*, XeF*, ArCl*, ArF*, KrCl*) or metal vapors. Advantageously, the various aforesaid gases or gas mixtures are used at pressures between $10^{-3}$ torr and 30 bars. When it is required to obtain the largest possible number of excitable molecules in a given cavity volume, I prefer to operate at or above atmospheric pressure. However, there are instances where it may be desirable to operate at a pressure substantially lower than atmospheric.

It is known that, in order to obtain a stimulated emission in a gas, the E/p ratio (E signifying the transient electric field established in the cavity and p the pressure in that cavity) must lie within a range of values between approximately 50 and 300 Volts/cm torr. According to the chosen pressure, the distance between the electrodes and/or the applied voltage should then be adjusted in order to obtain the appropriate E/p ratio.

BRIEF DESCRIPTION OF THE DRAWING

The accompanying drawing shows two embodiments of the laser according to the present invention, diagrammatically and by way of example. In the drawing.

SPECIFIC DESCRIPTION

Figure 1:
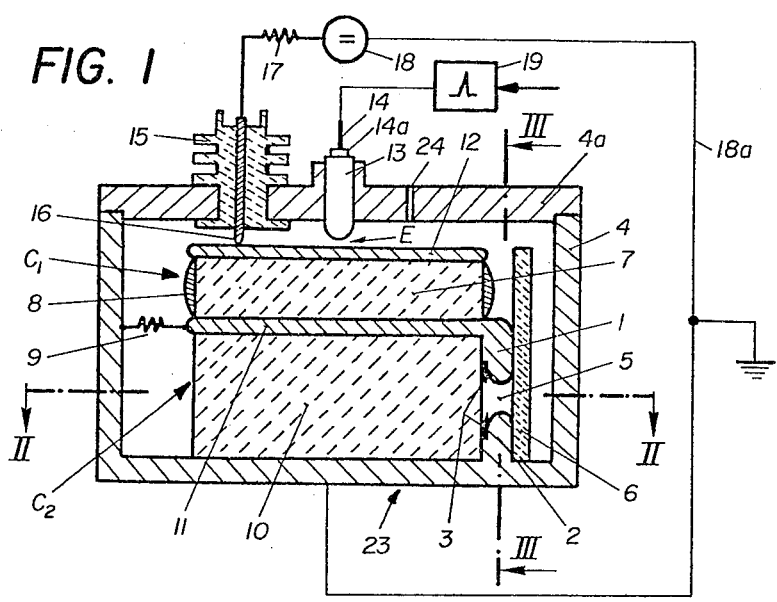
FIG. 1 is a cross-sectional view of the first embodiment.

The embodiment shown in FIGS. 1 to 6 represents a device of the "simple charge transfer" type. This embodiment comprises a sealed metal box or housing 23 in the form of a prismatic container 4 open at its top but sealed by a flat inserted cover 4a in close electrical contact therewith. Inside the box 23 there are stacked a first prismatic block 10 resting by its lower face on the base of the container 4, block 10 consisting of a high-dielectric-coefficient material (for example barium titanate ceramic); a first rectangular metal plate 11 covering the upper face of the block 10; a second prismatic block 7 resting on the plate 11 and consisting of the same dielectric material as block 10, the thickness of block 7 being substantially half the thickness of the block 10; and a second rectangular metal plate 12 covering the upper face of the block 7 while remaining spaced from the cover 4a.

Figure 2:
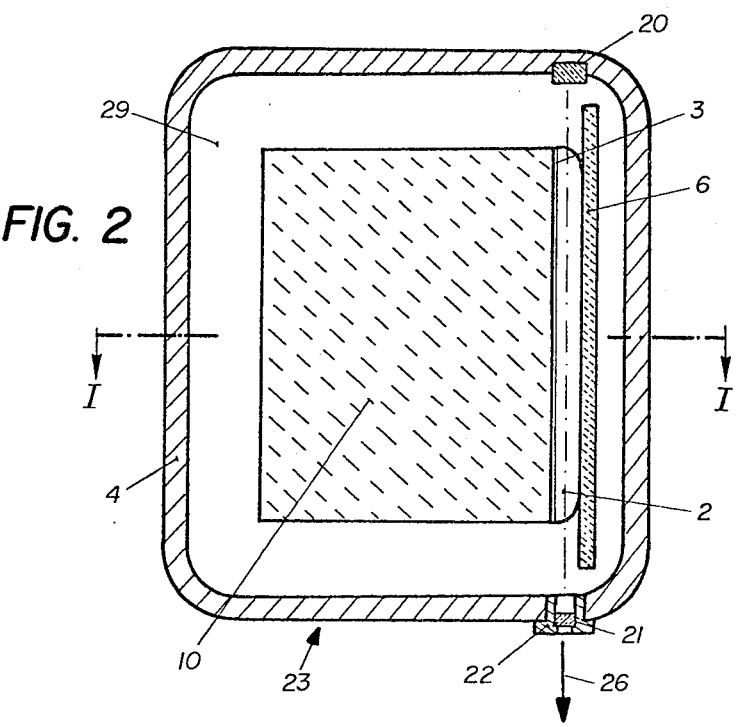
FIG. 2 is a longitudinal section taken on the line II—II of FIG. 1.

The assembly constituted by the dielectric block 7 and the metal plates 12 and 11 thus constitutes a first capacitor $C_1$, and the assembly constituted by the dielectric block 10, the metal plate 11 and the base of the container 4 constitutes a second capacitor $C_2$. The metal plate 11, which thus constitutes a common electrode of the two capacitors or condensers $C_1$ and $C_2$, is electrically connected by way of a resistor 9 to the box 23; this resistor 9 could be replaced by an inductance. The four sidewalls of the prismatic container 4 spacedly surround the stack 7, 10, 11, 12 as seen in FIG. 2.

Figure 4:
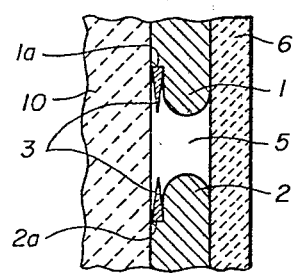
FIG. 4 is an enlarged sectional view of a detail of the device of FIGS. 1-3.
Figure 5:
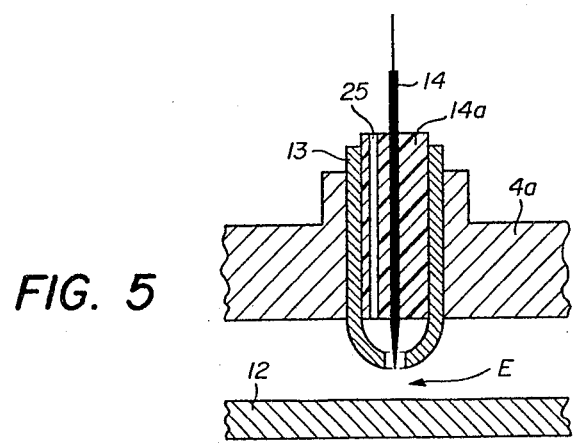
FIG. 5 is an enlarged sectional view of another detail of the device of FIGS. 1-3.

One of the longitudinal edges of the metal plate 11 has an extension in the form of a metallic lip or flange 1 which partly overhangs the corresponding lateral face of the dielectric block 10 and points towards the base of the container 4 serving as a lower condenser plate, the latter also having an extension in the form of a longitudinal metal rib or flange 2 in line with flange 1, partly overlying the same lateral face of the block 10. The free edges of lip 1 and rib 2 confronting each other are rounded. A rectangular insulating plate 6 (made for example of glass, plastic or a ceramic material) lies against the outer faces of lip 1 and rib 2, its purpose being to prevent any sparking between lip 1 and the adjoining portion of container 4. The longitudinal space thus defined between plate extensions 1 and 2 constitutes a resonant laser cavity 5 bounded by the insulating plate 6 and a middle portion of the lateral face of the block 10. The confronting edges of flanges 1 and 2 constitute the electrodes designed to establish a transverse discharge within cavity 5. As best seen in FIG. 4, flanges 1 and 2 are recessed adjacent the block 10 to form longitudinal shoulders 1a and 2a accommodating respective corona electrodes 3 for ensuring pre-ionization of the laser cavity. These corona electrodes 3 are constituted in known manner by straight metal strips (for example of hardened steel) with free razor edges pointed toward each other.

A cylindrical metal plug 13, kept in close electrical contact with the cover 4a, traverses that cover substantially at the center thereof. Plug 13 has a rounded end, which projects into the housing 23 toward the metal plate 12 and can be vertically displaced to adjust the gap separating this rounded end from the plate 12. The plug 13 is also traversed axially (FIG. 5) by a metal rod 14 insulated electrically therefrom by a dielectric sheath 14a. A pointed tip of rod 14 is flush with the downwardly projecting end of the plug 13 while its upper end is connected electrically to a high-voltage pulse generator 19. The rounded end of plug 13 and the proximal portion of the plate 12 thus constitute the two terminals of a spark gap E for initiating the electrical discharge, the rod 14 constituting in known manner the trigger electrode of that spark gap.

An insulating body 15 of high-dielectric-strength material (Delrin, Teflon etc.) extends through another portion of the cover 4a. Body 15 is traversed from one end to the other by a metal stud 16 having one end in close contact with the metal plate 12. The other end of stud 16 is connected electrically by way of a charging resistor 17 to one of the poles of a high-voltage direct-current source 18 whose other pole is connected to housing 23 by means of a grounded lead 18a.

The purpose of the metal stud 16 connected to the source 18 is thus to charge the capacitor $C_1$. The lateral walls of the dielectric block 7 forming part of capacitor $C_1$ are covered with an insulating sheath 8 (for example of silicone) to prevent any surface leakage of current between the electrodes 11 and 12.

Figure 3:
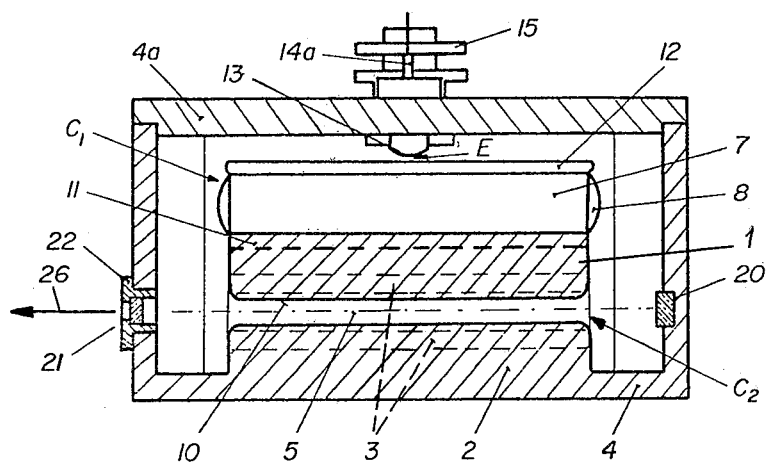
FIG. 3 is a longitudinal section taken on the line III—III of FIG. 1.

The laser cavity 5 is also fitted with a resonator formed from two mirrors disposed at opposite ends thereof as seen in FIGS. 2 and 3, namely a totally reflecting mirror 20, mounted at the rear of the cavity against the corresponding lateral wall of container 4, and a mirror-window 21 which is semitransparent or transparent at the wavelength considered and is mounted at the front of the cavity in a support flange 22 fixedly or adjustably traversing the opposite lateral container wall.

The box 23 is further provided (FIG. 5) with a gas inlet conduit 25 formed in the insulating sheath 14a of the plug 13 of spark gap E, and with a gas outlet conduit 24 passing through the cover 4a. The inlet conduit 25 allows the active laser medium to be fed under a predetermined pressure into the box 23 and specifically into the cavity 5. This conduit 25 opens advantageously at the level of the pointed tip of the trigger electrode 14 so that the entering gas flow can blow the electric arc developed in the spark gap toward the plate 12 in order to give good pre-ionization. The throughput of the gas evacuated through the discharge port 24 can be adjusted. The effect of the presence of this gas inside the box 23 is not only to provide laser emission in the cavity 5 but also to contribute to the electrical insulation of the stack within the box, particularly at the level of the spark gap E.

Figure 6:
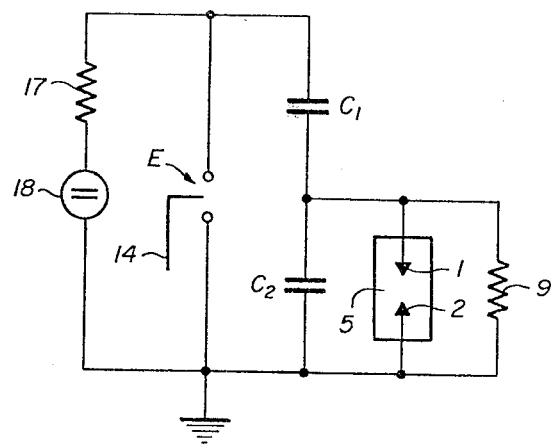
FIG. 6 is an equivalent electrical circuit diagram of the first embodiment.

FIG. 6 represents the equivalent electrical circuit diagram for the laser described. This diagram enables a better understanding of the operation of the laser, which is as follows: after connection of the high-voltage source 18, the capacitor $C_1$ rapidly charges by way of stud 16 whereby its upper plate 12 attains the potential of source 18 at the end of the charging period while its lower plate 11 is grounded; the capacitor $C_2$ remains completely discharged with both plates still at ground potential at the end of that period. At the proper moment, the generator 19 is operated to feed a high-voltage pulse to the trigger electrode 14 so as to discharge the spark gap E and thus to make same conducting. By way of the conducting gap E and the walls of the box 23 constituting a virtual short circuit across the cascaded capacitors $C_1$, $C_2$, the capacitor $C_1$ discharges rapidly into the capacitor $C_2$ which thus becomes suddenly charged. The upper plate 11 of capacitor $C_2$, isolated from ground by the presence of the resistor 9, is raised thereby to a transient potential of a polarity opposite that of the ungrounded source terminal relative to the lower plate constituted by the base of the enclosure 23, the magnitude of this transient potential depending on the voltage of the source 18 and on the respective capacitances of condensers $C_1$ and $C_2$. The capacitance of condenser $C_1$ is greater than that of condenser $C_2$ (double in the described embodiment) so as to compensate for the conduction losses of the spark gap E during the charge transfer.

The effect of the potential difference which appears between the plates of the capacitor $C_2$, and thus between the electrodes 1 and 2 of the laser cavity 5, is to produce inside that cavity a transverse electrical discharge of very high intensity and very short duration as the pre-ionization of the cavity due to the corona electrodes 3 is followed by a main discharge maintained by the potential difference across capacitor $C_2$. The gaseous active medium thus excited by the electrical discharge then gives rise to the production of a stimulated emission which may or may not be super-radiant. A resulting luminous laser pulse, shown diagrammatically on the drawing by the arrow 26, leaves by the window 21 after progressing along the longitudinal axis of the cavity 5 which parallels the free edges of electrodes 2, 3.

When the cascaded capacitors $C_1$ and $C_2$ have been completely discharged, the spark gap E cuts out and the capacitor $C_1$ is recharged. The laser is then ready to generate a new luminous pulse. These pulses can be produced recurrently by periodical activation of the trigger electrode 14.

EXAMPLE

By way of example, a laser structure analogous to that heretofore described can be designed with the following characteristics:

| Mechanical and Electrical Characteristics | |
|---|---|
| Dimensions of the ceramic blocks: | width = 60 mm |
| | length = 80 mm |
| | height = 12 mm (for block 7) |
| | = 24 mm (for block 10) |
| Dimensions of the cavity 5: | width = 8 mm (electrode thickness) |
| | height = 8 mm (distance between electrodes) |
| | length = 80 mm |
| Corona electrode: | thickness = 0.2 mm |
| Maximum charge voltage: | 20 to 30 kV |
| Laser-Emission Characteristics | |
| Gas: | $N_2$ at 1 bar |
| Emission wavelength: | 3371 A |
| Recurrence frequency: | 1 to $10^4$ hertz |
| Laser-pulse duration: | 1 to 2 nanoseconds |
| Pulse energy: | 300 microjoules |

The foregoing features show the particularly compact character of the structure thus formed. As can be seen, this particularly compact character derives not only from a reduction in the dimensions of the capacitive storage structure but in particular from a reduction in the actual dimensions of the laser cavity (especially its length), this being a completely unexpected and surprising result in that it has been generally assumed up to the present time that relatively long cavities were necessary to obtain stimulated emission. In the compact laser according to the invention, a stimulated emission can be obtained because of the correct combination of several interdependent factors; the smaller dimensions of the "charge transfer" system leads to a reduction in its characteristic impedance, enabling a more rapid current rise in the cavity which in turn results in an increase in the rate of population inversion with consequent reduction in the threshold length beyond which a stimulated emission can take place.

By way of comparison, a conventional "charge transfer" laser (using Mylar dielectric) would have to have a volume about 100 times larger and a weight about 100 times greater in order to give a like performance with identical peak power.

In the embodiment heretofore described, various modifications can be envisaged relating to the discharge electrodes fitted to the longitudinal edges of the laser cavity. Thus, simple rounded electrodes could be used without the addition of corona electrodes for low operating pressures. Likewise, simple flat electrodes could be fitted with corona electrodes pointing from their flat faces to give uniform ionization at pressures up to 760 torr. Rounded electrodes could also be covered with a radioactive element such as strontium 90, the $\beta$ radiation thus emitted serving to pre-ionize the cavity. For more details regarding these various electrodes, and regarding certain other constituent members of the laser according to the present invention, reference can be made to my above-identified applications and U.S. Pat. No. 4,292,600.

Figure 9:
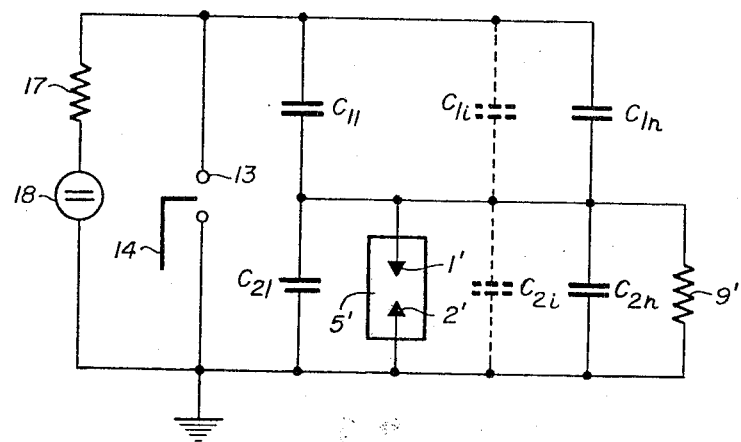
FIG. 9 is an equivalent electrical circuit diagram of the second embodiment.
Figure 7:
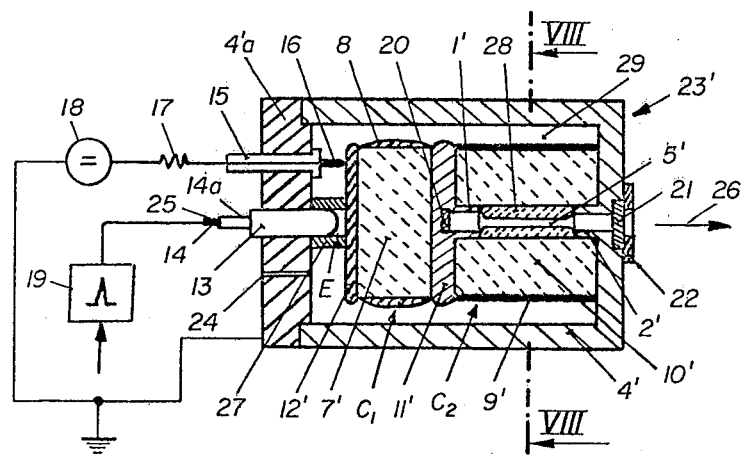
FIG. 7 is a diametrical sectional view of the second embodiment.
Figure 8:
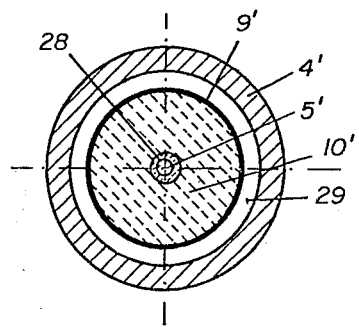
FIG. 8 is a section taken on the line VIII—VIII of FIG. 7.

The embodiment shown in FIGS. 7 to 9 constitutes a modification of the simple charge-transfer device of FIGS. 1 to 6, with the laser cavity excited longitudinally instead of transversely, this longitudinal excitation being obtained by means of a charge-transfer system of coaxial type analogous to an infinite number of capacitors in parallel.

The device shown in FIGS. 7 to 9 is substantially identical to that of FIGS. 1 to 6 (identical members having the same reference numerals), with the exception that the dielectric blocks are in this case of cylindrical instead of prismatic shape (the box being also cylindrical) and the laser cavity is provided inside one of these block instead of adjacent thereto. In detail, this device comprises a cylindrical metal box 23' consisting of an open-ended cylindrical container 4' closed by a flat circular cover 4'a. Inside the box 23' there are stacked a first cylindrical dielectric block 10' (e.g. of barium titanate ceramic) resting by one end face on the base of the container 4', a first circular metal plate or disk 11' overlying the opposite face of the block 10', a second cylindrical dielectric block 7' abutting the plate 11' and having an axial height substantially equal to half that of the block 10', and a second circular metal plate or disk 12' overlying the other face of the block 7' while remaining spaced from the cover 4'a. The assembly of dielectric block 7' and disks 12', 11' constitutes a first capacitor $C_1$ equivalent to an infinite number of small capacitors $C_{1i} \ldots C_{1i} \ldots C_{1n}$ connected in parallel, as indicated in FIG. 9, while the assembly of dielectric block 10', metal plate 11' and the base of the container 4' constitutes a second capacitor $C_2$ again equivalent to an infinite number of small capacitors $C_{2i} \ldots C_{2i} \ldots C_{2n}$ connected in parallel. The metal plate 11', which is common to the two capacitors or condensers $C_1$ and $C_2$, is connected electrically to the base of the container 4' by way of a charging resistor 9' which in this case is constituted by a resistive carbon film covering the entire peripheral surface of the block 10', that film being advantageously formed by vacuum deposition.

The cylindrical dielectric block 10' has an axial bore 5'0 which traverses it from one end to the other and which at one end receives a first annular electrode 1' rigid with the metal plate 11' and at its other end a second annular electrode 2' rigid with the base of the metal container 4'. The bore 5' forms the laser cavity, the electrodes 1' and 2' constituting the electrodes which establish a longitudinal electrical discharge within that cavity. Inside the cavity 5' there is also disposed a straight cylindrical tube 28 constructed of an insulating material very resistant to high temperature (e.g. a ceramic such as BeO, $SiO_2$, $ThO_2$) which serves to limit the cross-section of the laser cavity; by suitably choosing the inner diameter of tube 28, the intensity of the electric current circulating through the plasma during discharge at constant cavity pressure can be adjusted.

The laser cavity 5' is also fitted with a totally reflecting mirror 20, fixed to the base of the annular electrode 1', and a semitransparent mirror or window 21 fixed in an axial bore in the base of the container 4'. Advantageously, the cavity 5' thus provided with the mirrors 20 and 21 can be constructed as a sealed tube containing the gaseous active medium to be electrically excited. Alternatively, the gaseous active medium could occupy both the cavity 5' and the interior 29 of the box 23', to serve additionally as a dielectric insulant; this would require a suitable conduit connecting the cavity 5' with the space 29.

In this embodiment, too, I provide a metal stud 16 in contact with the metal plate 12' for charging the capacitor $C_1$ from the source 18, and a metallic plug 13 with rounded extremity confronting the plate 12' to constitute the spark gap E for discharging the capacitor $C_1$ by way of the trigger electrode 14 and for transferring its charge to the capacitor $C_2$ in order to provide stimulated emission within the laser cavity 5'. Spark gap E is advantageously surrounded by an annular partition 27 of ceramic or other insulating material so as to be able to operate with different gases at the spark gap and in the box 23' and/or cavity 5'; partition 27 could be dispensed with if identical gases are used.

If the cavity 5' is completely sealed, the interior 29 of the box 23 could be occupied by a liquid dielectric (such as oil or distilled water), the spark gap E then being immersed in that liquid to serve as an ultrarapid discharge switch. In such a case I prefer to dispense with the trigger electrode 14, the gas inlet 25 and the insulating tube 14a, FIG. 5, as the spark gap E is then self-starting, discharge being produced at the moment when the voltage across the terminals of the gap exceeds the breakdown voltage of the liquid dielectric.

FIG. 9 shows the equivalent electrical circuit diagram of the laser of FIGS. 7 and 8. The operation of such a laser is analogous to that previously described, except that the electrical discharge within the cavity 5' takes place in this case longitudinally instead of transversely.

In both embodiments described above, it is possible to use a spark gap filled with a gaseous dielectric medium differing in composition and/or pressure from the gaseous active medium in the laser cavity. When a gaseous medium is used in the gap, a trigger electrode may or may not be provided. A spark gap with a liquid or solid dielectric medium instead of a gaseous fluid could likewise be used.

Moreover, such a spark gap could be replaced by any other discharge initiator capable of performing an equivalent function, namely momentarily short-circuiting two plates, so as to cause charge transfer between two capacitors. Such a discharge could also be initiated by semiconductor switches, which have the advantage of a lower energy dissipation, or by thyratron switches. Thyratrons have the particular advantage of allowing a higher repetition frequency and a greater triggering accuracy, coupled with a much longer service life.

The laser according to the invention has various advantages, among them its particularly compact character and its excellent electrical characteristics. Its highly compact character leads to a considerable reduction in overall size for peak powers equal to those of conventional a lasers, or, conversely, affords considerably higher peak powers for a given overall size.

The excellent electrical properties of the laser according to the invention also result in a considerable reduction both in the characteristic line impedance and in the total circuit impedance. This low characteristic line impedance allows operation at high pressure, which enables pulses of very short duration (picosecond pulses) to be obtained while yielding an additional gain in the total circuit impedance. These factors, by giving a much higher pumping speed, also allow a better quantum pumping efficiency to be obtained. Such a laser also has the advantage of possessing great mechanical strength and a very good resistance to the temperature cycles. The use of ceramic materials also has the additional advantages over conventional dielectrics of not being destructible by the corona ionization, of having a relatively long service life and of being highly insensitive to radioactive radiation, thus allowing use of the device in a radioactive environment. This type of laser can also operate at a relatively high recurrence frequency (if necessary by providing a transverse gas purge) while giving a relatively small loss-angle factor at these frequencies. Finally, this device enables laser pulses of much longer duration to be obtained while exhibiting an improved efficiency (of the order of 10 to 20%) over that obtained with Blumlein lines at high repetition frequencies.

The laser according to the invention can find very wide application in various fields such as:
excitation source for photochemistry;
plasma analysis for thermonuclear research;
research tool for studying the life spans of excited molecules;
Raman spectrometry;
approach altimeter for aviation;
pumping of liquid laser (for wavelengths ranging from 3500 to 11,800 A);
VHV spark gap triggered by UV;
portable high-resolution telemeter;
target illumination (location, firing);
atmospheric-pollution detector (Raman-laser radars);
aerosol and relative-humidity measurement in the atmosphere;
means of underwater communication;
means of long-distance communication (upwards of 20 km) at low frequency (up to 20 kHz);
high-power generator of coherent light at 5401 A;
opto-electronic use;
command generator for Auston switches.

I claim:
1. A laser comprising:
a first and a second nonconductive block of solid material having a high dielectric constant, said blocks forming a stack and having each two flat opposite end faces parallel to and substantially coextensive with those of the other of said block;

a first metallic member inserted between and in contact with two juxtaposed end faces of said blocks;

a second metallic member overlying the other end face of said first block and defining therewith and with said first member a first capacitor;

a third metallic member overlying the other end face of said second block and defining therewith and with said first member a second capacitor in cascade with said first capacitor, said first and third members being provided with respective extensions forming a pair of confronting, spaced-apart electrodes;

a housing surrounding said blocks and enclosing an elongate resonant cavity filled with a radiation-emissive gaseous medium, said cavity being bounded in part by said confronting electrodes;

impedance means for galvanically interconnecting said first and third members;

terminal means for connecting a source of direct current between said second and third members to develop a voltage difference across the cascaded first and second capacitors, said impedance means keeping said second capacitor substantially discharged while enabling said first capacitor to be charged; and discharge-initiating means inserted between said second and third members for temporarily interconnecting same with establishment of a virtual short circuit across said cascaded capacitors whereby said first capacitor is enabled to discharge into said second capacitor and to set up a potential difference across said impedance means and said confronting electrodes in parallel therewith, said potential difference stimulating said gaseous medium in said cavity into an emission of luminous coherent radiation, said housing being provided with a window transparent to the emitted radiation adjacent one end of said cavity.

2. A laser as defined in claim 1 wherein said first capacitor has a substantially higher capacitance than said second capacitor.

3. A laser as defined in claim 2 wherein said second block has a thickness between said end faces thereof equal to approximately twice the corresponding thickness of said first block.

4. A laser as defined in claim 1, 2 or 3 wherein said housing means comprises a metallic enclosure with a wall portion forming said third member.

5. A laser as defined in claim 4 wherein said second block forms a boundary of said cavity between said confronting electrodes.

6. A laser as defined in claim 5 wherein said blocks are prismatic, said extensions being a pair of flanges partly overlying a lateral face of said second block forming said boundary, said flanges having free edges parallel to a longitudinal axis of said cavity.

7. A laser as defined in claim 6 wherein said free edges are rounded and are juxtaposed with a pair of corona electrodes pointing toward each other, said corona electrodes being inserted between said flanges and said lateral face.

8. A laser as defined in claim 6 wherein said enclosure is a prismatic container with a bottom constituting said wall portion and with sidewalls spacedly surrounding said stack, said housing further comprising a metallic cover spacedly overlying said second member, said cavity being further bounded by an insulating plate paralleling said lateral face and contacting said flanges, said cavity opening endwise into the space surrounding said second block, one of said sidewalls being provided with said window, another of said sidewalls being provided with a radiation reflector opposite said window, said first and second members being rectangular plates substantially coextensive with said end faces.

9. A laser as defined in claim 8 wherein said discharge-initiating means comprises a conductive plug traversing said cover and forming a spark gap with said second member, said plug being connectable to a generator of trigger pulses adapted to break down said spark gap.

10. A laser as defined in claim 8 wherein said terminal means comprises a conductive stud insulatedly traversing said cover and contacting said second member.

11. A laser as defined in claim 5 wherein said blocks are cylindrical and coaxial with each other, said second block being provided with an axial bore forming said cavity, said extensions being a pair of annular elements projecting into said bore from opposite ends thereof, said window being formed in said wall portion adjacent one of said annular elements, said first member being provided with a radiation reflector adjacent the other of said annular elements.

12. A laser as defined in claim 11, further comprising a dielectric tube extending in said bore between said annular elements for reducing the diameter of said cavity.

13. A laser as defined in claim 11 wherein said enclosure is a cylindrical container coaxial with said stack, said container having a peripheral wall spacedly surrounding said blocks, a closed end formed by said wall portion and an open end closed by a metallic cover which is parallel to and spaced from said second member, said first and second members being blocks substantially coextensive with said end faces.

14. A laser as defined in claim 13 wherein said discharge-initiating means comprises a conductive plug traversing said cover and forming a spark gap with said second member, said plug being connectable to a generator of trigger pulses adapted to break down said spark gap.

15. A laser as defined in claim 14 wherein said spark gap is surrounded by an annular partition of insulating material in contact with said cover and said second member.

16. A laser as defined in claim 13 wherein said terminal means comprises a conductive stud insulatedly traversing said cover and contacting said second member.

17. A laser as defined in claim 13 wherein said impedance means comprises a resistive carbon film on a peripheral surface of said second block.

18. A laser as defined in claim 1, 2 or 3 wherein said solid material has a dielectric constant of at least 80.

19. A laser as defined in claim 18 wherein said solid material is a composition based on barium titanate or titanium oxide.

20. A laser as defined in claim 4 wherein said impedance means comprises a resistor connected between said enclosure and said first member.

* * * * *